Jan. 7, 1930.  W. B. WALKER  1,743,055
UNLOADER
Filed May 12, 1926   2 Sheets-Sheet 2

Willis B. Walker Inventor
By C. A. Snow & Co.
Attorneys

Patented Jan. 7, 1930

1,743,055

UNITED STATES PATENT OFFICE

WILLIS B. WALKER, OF MACUNGIE, PENNSYLVANIA

UNLOADER

Application filed May 12, 1926. Serial No. 108,652.

This invention aims to provide a simple means whereby the unloading valve of an air compressor may be regulated, the device being so constructed that it will not consume much air in operation.

It is within the province of the disclosure to improve generally and to enhance the utility of devices of that type to which the invention appertains.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
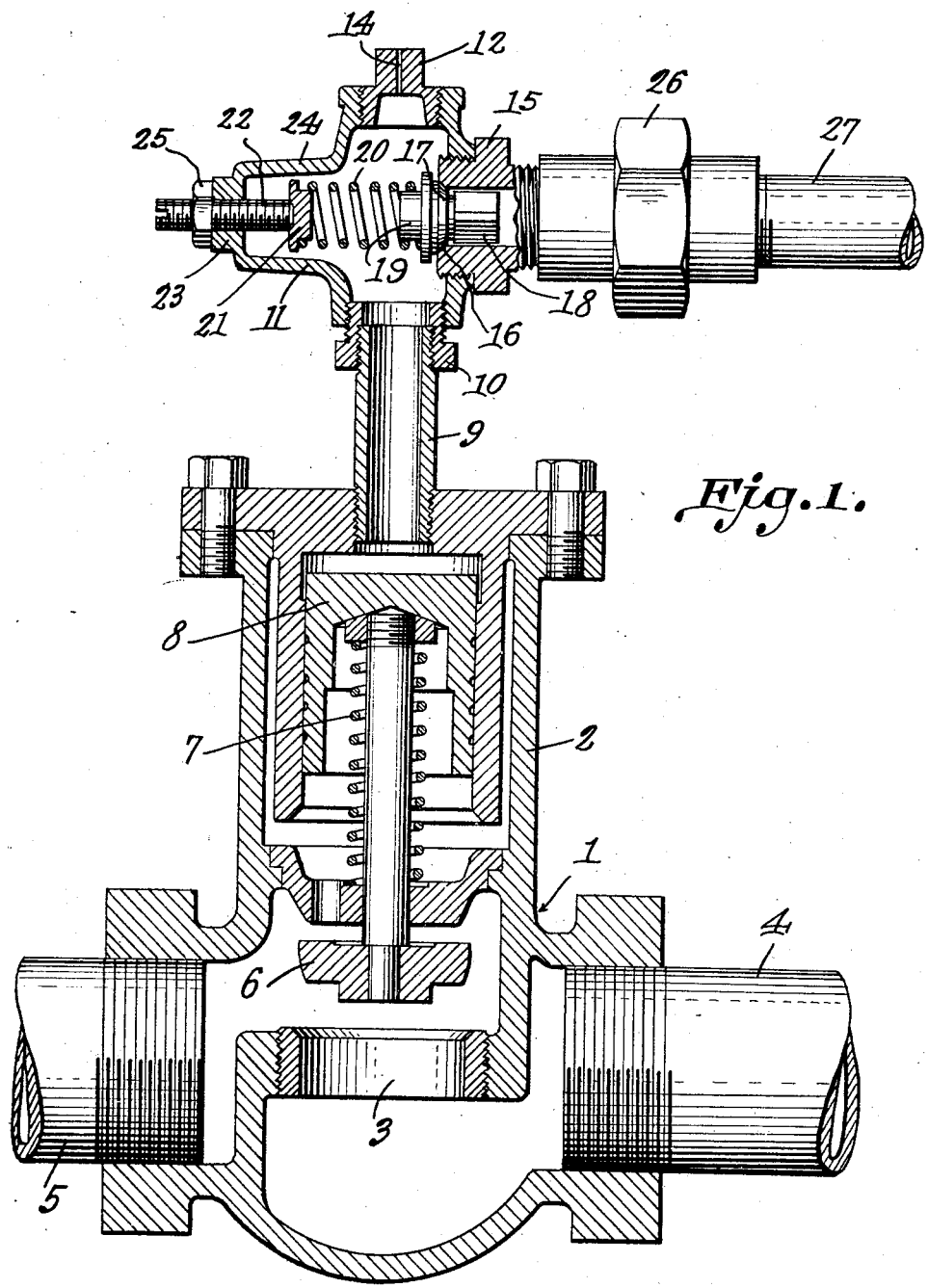
Figure 1 shows in section, a device constructed in accordance with the invention, parts being in elevation, and the valve of the regulator being closed.
Figures 2, 3:
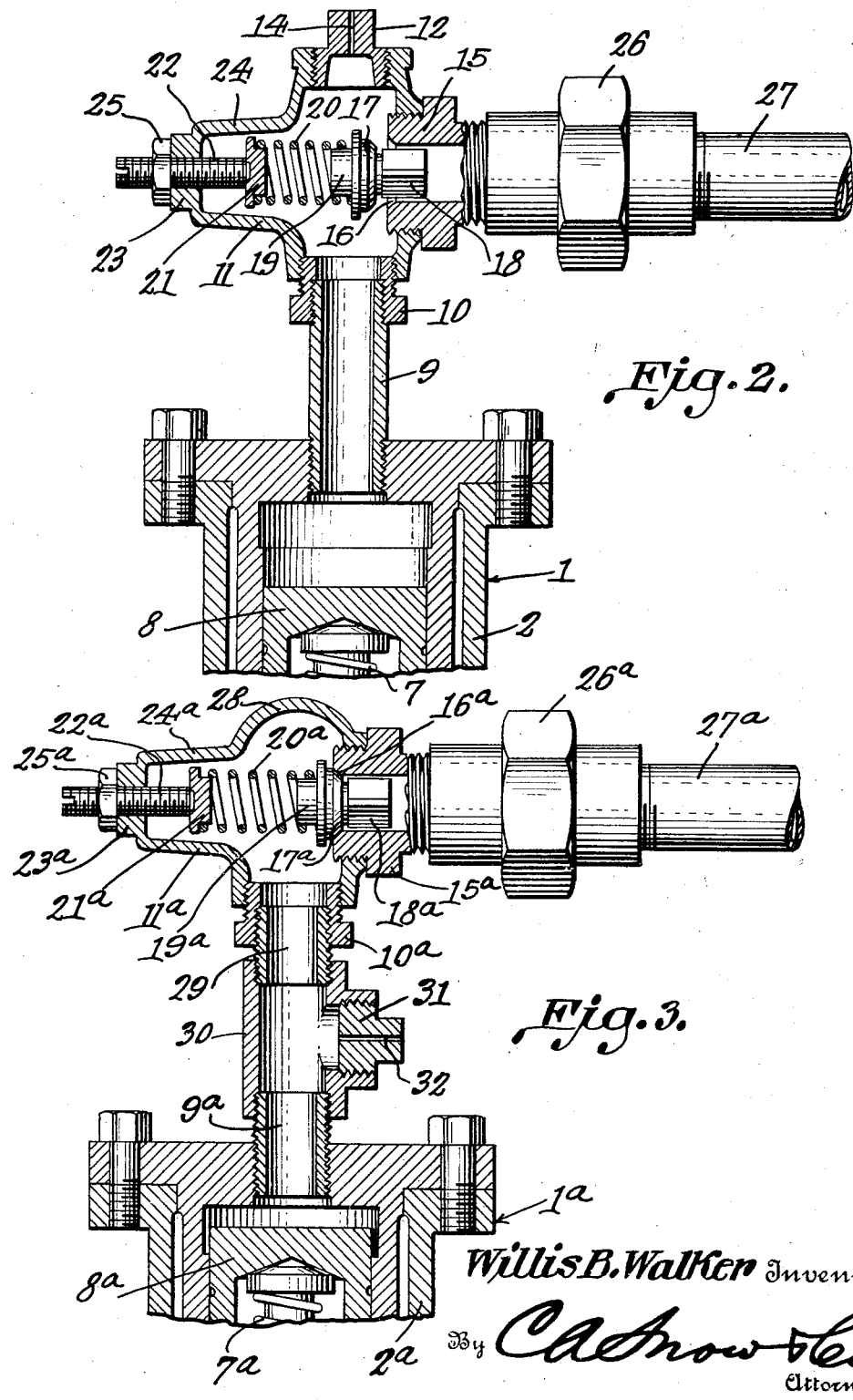
Figure 2 is a similar view wherein the valve of the regulator is open, parts being broken away.
Figure 3 is a sectional view wherein parts are broken away, a slight modification being shown.

In Figures 1 and 2, the numeral 1 designates, generally, the unloader valve mechanism for an air compressor, the unloader comprising a body or casing 2 within which is located a seat 3 disposed between pipes 4 and 5 assembled with the body 2, either of the pipes being the inlet, and the other the outlet. A valve 6 cooperates with the seat 3 to open and close the passage through the unloader, the stem of the valve being slidably mounted in the body 2, and the valve being moved to open position with respect to the seat 3, by means of a spring 7. A hollow piston 8 slides in the body 2 and, cooperating with the stem of the valve 6, closes the valve on the seat 3, against the action of the spring 7. The description of the unloader has been made short, because the unloader is of a known form, and because many kinds of unloaders may be used in connection with the device forming the subject matter of this application.

A nipple 9 is threaded into the body 2 and is held by a coupling 10 on a hollow casing 11 into which is threaded a vent plug 12 having a minute bleed port 14, the plug being located oppositely to the nipple 9. A sleeve 15 is threaded into the casing 11 at right angles to the nipple 9 and is supplied at its inner end with a seat 16 wherewith cooperates a valve 17 having guide wings 18 that are slidable in the bore of the sleeve 15, the valve being provided with a boss 19 receiving one end of a compression spring 20, the other end of which is engaged by a foot 21, journaled or otherwise mounted on an adjusting device 22, preferably a screw which is threaded into the thickened end 23 of an extension 24 on the casing 11, the screw being held in adjusted positions by a nut 25, which, being threaded on the screw, engages the end 23 of the part 24 of the casing 11. By means of a union 26, the sleeve 15 is connected to a pipe 27 which communicates with the air tank (not shown).

Assuming that the parts are in the positions shown in Figure 1, when the air pressure in the tank builds up to a predetermined point, pressure delivered from the tank through the pipe 27, unseats the valve 17 against the action of the spring 20, pressure being communicated through the nipple 9 on top of the piston chamber 8, the said piston moving downwardly and closing the valve 6 on the seat 3, so that no more air under pressure is supplied to the tank. When the pressure in the tank eases off enough, the valve 17 closes under the impulse of the spring 20 and the pressure within the casing 11 bleeds away through the port 14, the piston 8 moving upwardly, and the valve 6 moving to open position with respect to the seat 3, under the action of the spring 7. The device has but one bleed port, to wit, the port 14, and leakage of air pressure, therefore, is cut down to a minimum. The spring 20 may be adjusted by threading the screw 22 in or out and holding it by the lock nut 25.

In Figure 3, parts hereinbefore described have been designated by numerals previously used, with the suffix "a." The modification consists, substantially, in omitting the plug 12 of Figure 2 and closing the casing 11ᵃ at 28. A nipple 29 joins the coupling 10ᵃ with a T 30 into the lateral branch of which is threaded a plug 31 having a bleed port 32 that takes the place of the bleed port 14 of Figure 2. The T 30 is joined to the nipple 9ᵃ.

The operation of the structure shown in Figure 3 will be understood readily from what has been stated hereinbefore concerning the operation of the form depicted in Figs. 1 and 2.

The parts 9, 11, 15, 26 and 27, and the parts 9ᵃ, 30, 29, 10ᵃ, 11ᵃ, 15ᵃ, 26ᵃ and 27ᵃ constitute, in each form of the invention, a fluid-pressure conduit which communicates with the means 8 whereby the valve 6 is closed. The valves 17 or 17ᵃ are interposed in the respective conduits, and the ports 14 or 32 are so located as to relieve pressure between the valves 17 or 17ᵃ and the corresponding fluid-pressure-actuated means 8 or 8ᵃ, whereby the valve 6 is closed.

The single bleed port, such as the bleed port 14, for instance, is "located in advance" of the fluid-pressure means 8: meaning thereby that the port 14 is not placed anywhere between the said means 8 on the one hand, and the valve 6 on the other hand.

What is claimed is:

In the device of the class described, a hollow body, a valve operating in the body and controlling the passage of fluid through the body, a piston slidable in the body and operatively connected with the valve to open and close the valve, a casing having an inlet, a connection disposed at right angles to the inlet and establishing communication between the casing and the body, thereby to operate the piston, the axis of the connection being parallel to the line of reciprocation of the piston, there being a vent in the casing diametrically opposite to the connection, and coaxial with respect to the connection, a valve in the casing operating at right angles to the axis of the connection, spring means in the casing for closing the last specified valve, thereby to close the inlet, and mechanism mounted in the casing for adjusting the spring means.

In testimony that I claim the foregoing as my own, I have hereto affixed my signature.

WILLIS B. WALKER.